(12) United States Patent
Ohara

(10) Patent No.: US 8,314,972 B2
(45) Date of Patent: Nov. 20, 2012

(54) IMAGE PROCESSING PROGRAM, IMAGE PROCESSING APPARATUS, AND IMAGE PROCESSING METHOD FOR SUPPRESSING SEE-THROUGH PHOTO-OPTICAL APPEARANCE

(75) Inventor: Taira Ohara, Sumida-ku (JP)

(73) Assignee: Seiko Epson Corporation, Tokyo (JP)

( * ) Notice: Subject to any disclaimer, the term of this patent is extended or adjusted under 35 U.S.C. 154(b) by 327 days.

(21) Appl. No.: 12/825,258

(22) Filed: Jun. 28, 2010

(65) Prior Publication Data

US 2010/0328727 A1 Dec. 30, 2010

(30) Foreign Application Priority Data

Jun. 29, 2009 (JP) ................................. 2009-153411

(51) Int. Cl.
*H04N 1/40* (2006.01)
(52) U.S. Cl. ......... 358/3.01; 358/2.1; 358/3.1; 358/521; 358/522
(58) Field of Classification Search .......... 358/1.1–3.29, 358/521, 522
See application file for complete search history.

(56) References Cited

FOREIGN PATENT DOCUMENTS

| JP | 10-304204 A | 11/1998 |
|---|---|---|
| JP | 2005-277886 A | 10/2005 |
| JP | 2009-140244 A | 6/2009 |

*Primary Examiner* — Benny Q Tieu
*Assistant Examiner* — Marcellus Augustin
(74) *Attorney, Agent, or Firm* — Kilpatrick Townsend & Stockton LLP

(57) ABSTRACT

An image processing apparatus includes: a quadrangular or polygonal area setting unit that sets a quadrangular or polygonal area that surrounds a group of pixels that has predetermined characteristics for image data; a background setting unit that measures frequency distribution of tone values outside the quadrangular or polygonal area, measures a brightest tone value B in a margin range, which is a range of tone values in which the image data is distributed significantly, measures a most frequent value M in the margin range, and sets a background range, which is a range that includes the most frequent value M as a median point and further includes the brightest tone value B as one end of the range; a black edge statistics unit that measures frequency distribution of tone values of black edge inside the quadrangular or polygonal area and measures a greatest brightness value b in a black edge range, which is a range of tone values in which the black edge is distributed significantly.

7 Claims, 6 Drawing Sheets

IMAGE PROCESSING PROGRAM, IMAGE PROCESSING APPARATUS, AND IMAGE PROCESSING METHOD FOR SUPPRESSING SEE-THROUGH PHOTO-OPTICAL APPEARANCE

This application claims priority to Japanese Patent Application No. 2009-153411, filed Jun. 29, 2009, the entirety of which is incorporated by reference herein.

BACKGROUND

1. Technical Field

The present invention generally relates to an image processing program, an image processing apparatus, and an image processing method. In particular, the invention relates to a technique for suppressing see-through photo-optical appearance of any reverse-side image on the front of a reproduced copy, which typically occurs in copying.

2. Related Art

It is known in the art that a phenomenon of so-called "see-through photo-optical image appearance" may occur when the front of a sheet of original document is read optically. The see-through photo-optical image appearance is an undesirable phenomenon of photo-optical appearance of an image or the like that is actually printed on the back of a sheet of original document but scanned as a see-through image, which is not supposed to be, together with an image or the like that is printed on the front of the sheet when the front of the sheet is scanned for copying. When such a phenomenon happens, the reverse-side see-through image appears in a faint color or grayscale on a print copy.

To provide a solution to such a phenomenon, a technique for suppressing reverse-side see-through image components by using a weighted addition method is disclosed in JP-A-10-304204. In the related art disclosed in JP-A-10-304204, image data that is acquired by scanning the front of a sheet of original document is added to inverse reverse-side image data, which is acquired by reversing image data acquired by scanning the back of the sheet, while weighting them.

As another solution to the above phenomenon, a technique for suppressing reverse-side see-through image components and background components (i.e., color components of a sheet of paper itself) is disclosed in JP-A-2005-277886. In the related art disclosed in JP-A-2005-277886, measurement is carried out to obtain the frequency distribution of tone values of image data that is acquired by scanning the front of a sheet of original document. One of predetermined threshold values is selected on the basis of a tone value corresponding to a halftone peak. The selected threshold value is used for binarization. By this means, reverse-side see-through image components and background components are suppressed.

SUMMARY

However, the technique disclosed in JP-A-10-304204 has the following problems. Since it is necessary to acquire image data by scanning both the front and the back of a sheet of original document, an ADF (Automatic Document Feeder) that has a complex structure is required. In addition, a processing speed is slower.

The technique disclosed in JP-A-2005-277886 has the following problems. In a case where there are a large number of halftone pixels having a wide range of tones, for example, as in a photo image, it is often difficult to select a proper threshold value for distinguishing photo image components from reverse-side see-through image components. In addition, since a halftone peak does not appear clearly when the amount of reverse-side see-through image components is small, it is difficult to select a proper threshold value.

An advantage of some aspects of the invention is to provide a technique for suppressing see-through photo-optical appearance of any reverse-side image on the front of a reproduced copy, which typically occurs in copying.

(1) To offer the above advantage without any limitation thereto, an image processing program according to an aspect of the invention causes a computer to implement functions comprising: a quadrangular or polygonal area setting function of setting a quadrangular or polygonal area that surrounds a group of pixels that has predetermined characteristics for image data; a background setting function of measuring frequency distribution of tone values outside the quadrangular or polygonal area, measuring a brightest tone value B in a margin range, which is a range of tone values in which the image data is distributed significantly, measuring a most frequent value M in the margin range, and setting a background range, which is a range that includes the most frequent value M as a median point and further includes the brightest tone value B as one end of the range; a black edge statistics function of measuring frequency distribution of tone values of black edge inside the quadrangular or polygonal area and measuring a greatest brightness value b in a black edge range, which is a range of tone values in which the black edge is distributed significantly; a judging function of judging, among all groups of pixels included in the image data, some groups of pixels that have tone values that fall within a target range as target components, the target range being a range that is included in the margin range and is brighter than the greatest brightness value b; and a correcting function of correcting the target components.

There is a great possibility that a group of pixels (components) that corresponds to a string of characters, a photo image, or a graphic object that is printed on the front of a sheet of original document includes a group of pixels that is deeper than the ground color of the sheet and reverse-side see-through image components and/or constitutes a sharper edge. In most cases, each of a photo image and a graphic object is laid out in a rectangular area. In addition, each single character is laid out in a rectangular area. Therefore, when a quadrangular or polygonal area that surrounds a group of pixels that has predetermined characteristics is set for image data, there is a great possibility that any string of characters, photo image, or graphic object that is printed on the front of a sheet of original document is not located outside the quadrangular or polygonal area. Besides background components, there is a possibility that reverse-side see-through image components and tone values of a string of characters, a photo image, or a graphic object that is printed on the front of a sheet of original document in a very faint color or grayscale are included in a margin range, which is a range of tone values in which image data is distributed significantly. Since the dispersion of the tone values of background components shows approximately a normal distribution, when a range that includes a most frequent value M in a margin range as a median point and further includes a brightest tone value B as one end of the range is set as a background range, it follows that components whose tone values fall within the background range are made up of a group of pixels that corresponds to background and a group of pixels that has the same color as the color of the background. On the other hand, since a greatest brightness value b in a black edge range, which is a range of tone values in which black edge is distributed significantly inside the quadrangular or polygonal area, corresponds to black edge in the brightest area of a string of characters, a photo image, or a graphic object that is printed on the front of a sheet of original document with a usual depth, it is preferable to treat tone values from a least (i.e., darkest) brightness value of the black edge range to the greatest brightness value b of the black edge range as a group of pixels that corresponds to a string of characters, a photo image, or a graphic object that is printed on the front of a sheet of original document. In view of the above, in the above aspect of the invention, among all groups of pixels included in image data, some group(s) of pixels that have tone values that fall within a target range, which is a range that is included in the margin range and is brighter than the black edge range, are selectively judged as target components; then, the target components are corrected. With an image processing program according to the above aspect of the invention, since the characteristics of reverse-side see-through image components are not used directly for judgment for a range of tone values of the reverse-side see-through image components, it is possible to set a proper threshold value even when the tone values of the reverse-side see-through image components are distributed in a wide range and when there is not any clear peak in the distribution thereof. Therefore, it is possible to suppress see-through photo-optical appearance of any reverse-side image on the front of a reproduced copy.

(2) In an image processing program according to the above aspect of the invention, it is preferable that the target range should be darker than the background range. With such a preferred image processing program, it is possible to correct reverse-side see-through image components without correcting a group of pixels corresponding to background.

(3) In an image processing program according to the above aspect of the invention, it is preferable that the judging section should judge whether the background range overlaps with the black edge range or not; and in a case where the background range overlaps with the black edge range, it should be judged that there is no target component. With such a preferred image processing program, it is possible to avoid a string of characters, a photo image, or a graphic object that is printed on the front of a sheet of original document from being corrected as target components.

(4) In an image processing program according to the above aspect of the invention, it is preferable that the correcting section should substitute the most frequent value M for tone values of the target components. With such a preferred image processing program, it is possible to correct the target components in such a manner that it is practically impossible or difficult to distinguish the corrected target components from the background.

(5) In an image processing program according to the above aspect of the invention, it is preferable that the correcting section should substitute an average value of tone values of a group of pixels that have the tone values falling within the background range for tone values of the target components. With such a preferred image processing program, it is possible to correct the target components in such a manner that it is practically impossible or difficult to distinguish the corrected target components from the background.

Besides an image processing program, the invention encompasses, and thus can also be embodied as, an image processing apparatus, an image processing method, and a storage medium in which an image processing program according to the above aspect of the invention is stored. Needless to say, a storage medium in which an image processing program according to the above aspect of the invention is stored may be selected among various kinds of storage media including but not limited to a magnetic recording medium and a magneto-optic recording medium. In addition to these existing and known storage media, any new type of a storage medium that will be developed in future may be used as a storage medium in which an image processing program according to the above aspect of the invention is stored.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
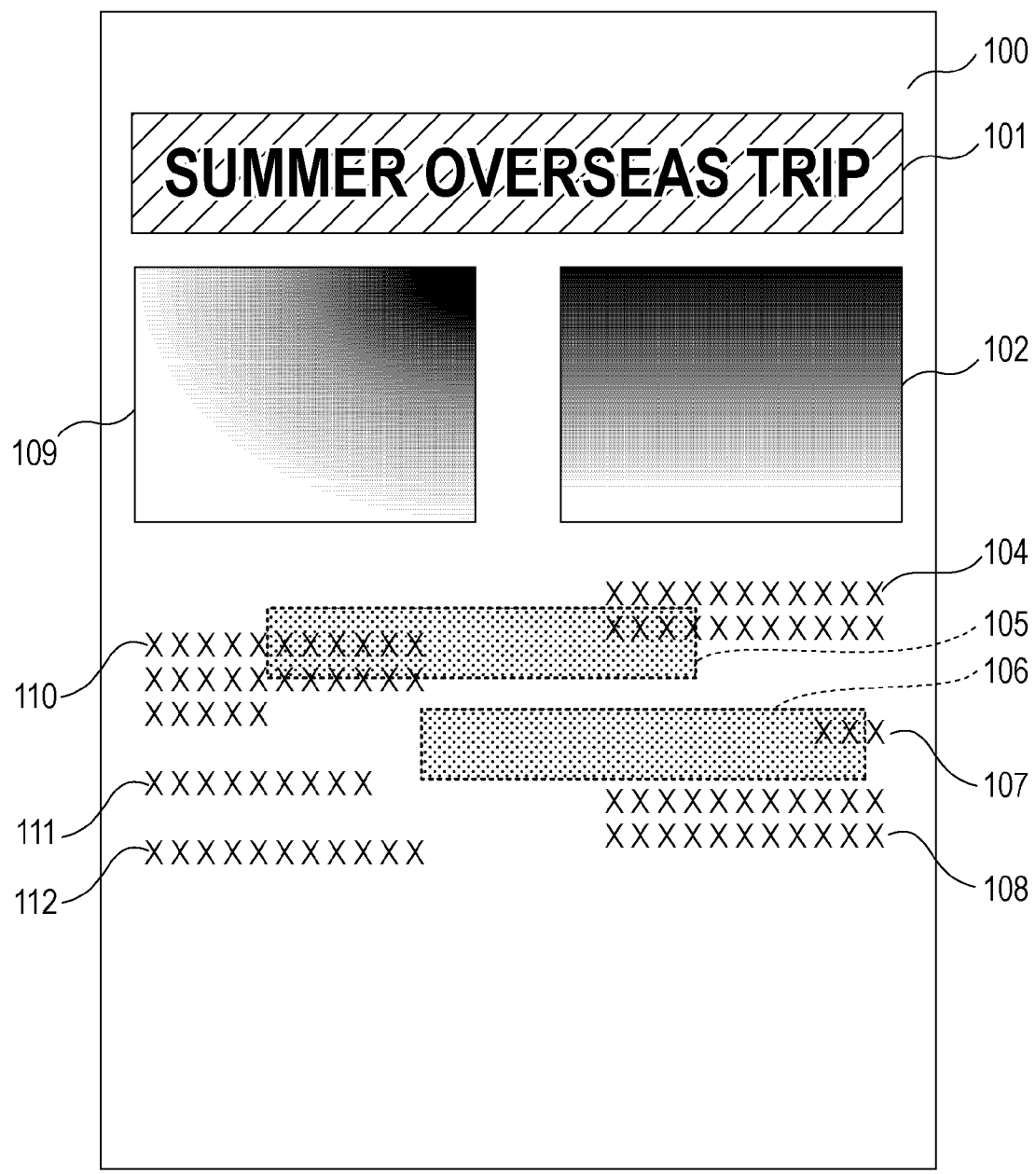
FIG. 1 is a schematic diagram according to an exemplary embodiment of the invention.

With reference to the accompanying drawings, exemplary embodiments of the present invention will now be explained in detail. In the following description and the accompanying drawings, the same reference numerals are consistently used for the same components to omit redundant explanation.

1. Overview

In the description of an exemplary embodiment of the invention (hereinafter referred to as the present embodiment of the invention) in the next and subsequent paragraphs of this specification, the technical concept of the invention is explained in detail with the use of the following processing example: image data is acquired by optically reading the front of a sheet of original document by means of a scanner; then, reverse-side see-through image components are corrected in an image processing apparatus; thereafter, the corrected image data is printed by means of a printer.

FIG. 1 is a diagram that schematically illustrates an example of image data that is acquired by optically reading the front of a sheet of original document by means of a scanner. The image data includes a group of pixels 100 that corresponds to the ground color (i.e., background) of a sheet of original document, a group of pixels 101 that corresponds to the title of the original document that is printed on the front of the sheet, group of pixels 102 and 109 each of which corresponds to a photo image that is printed on the front of the sheet, group of pixels 104, 107, 108, 110, 111, and 112 each of which corresponds to a character string that is printed on the front of the sheet, and group of pixels 105 and 106 each of which corresponds to reverse-side see-through image components of a graphic object that is printed on the back of the sheet. In the present embodiment of the invention, image data is corrected in such a way as to make it practically impossible or difficult to distinguish the groups of pixels 105 and 106 each of which corresponds to reverse-side see-through image components from the group of pixels 100 that corresponds to the ground color of a sheet of original document. By this means, the present embodiment of the invention suppresses see-through photo-optical appearance of any reverse-side image on the front of a reproduced copy.

2. Configuration of Image Processing Apparatus

Figure 2:
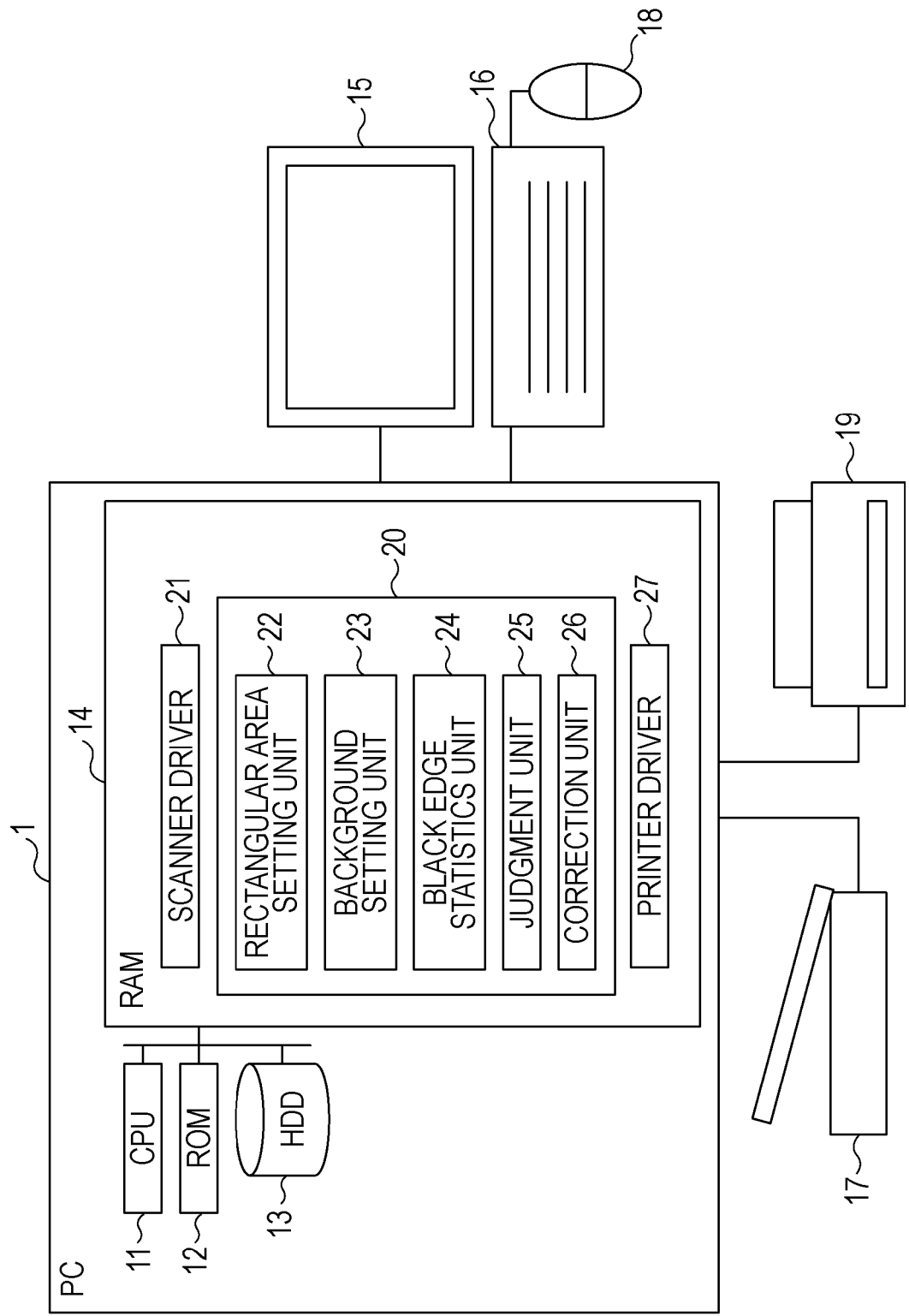
FIG. 2 is a block diagram according to an exemplary embodiment of the invention.

An image processing apparatus 1 illustrated in FIG. 2 is embodied as a personal computer (PC) that is provided with a CPU 11, a RAM 14, a ROM 12, a hard disk drive (HDD) 13, an input/output interface that is not illustrated in the drawing, and the like. A display device 15, a keyboard 16, a scanner 17, a mouse 18, and a printer 19 are connected to the image processing apparatus 1. The display device 15 is used for displaying graphical user interface (GUI) for the image processing apparatus 1. The keyboard 16 and the mouse 18 are used for operating the image processing apparatus 1 via the GUI. The scanner 17 is used for acquiring image data from a sheet of original document. The printer 19 is used for printing out the image data. The image processing apparatus 1 may be embodied as the PC, which is provided as an independent device that is separated from the printer 19 and the scanner 17 and executes an image processing program 20. Alternatively, the image processing apparatus 1 may be embodied as, for example, a microcomputer that is built in a copying machine that operates independently of the PC and executes the image processing program 20. In the present embodiment of the invention, the image processing program 20 as well as a scanner driver 21 and a printer driver 27, which function in cooperation with the image processing program 20, are installed in the HDD 13. They are loaded into the RAM 14 and executed by the CPU 11.

The scanner driver 21 is a program that controls the scanner 17 in response to instructions given by a user through the operation of the keyboard 16 and the mouse 18 or in response to a request issued by other program and thereby causes the scanner 17 to acquire image data by scanning an original document. The image data acquired by the scanner 17 under the control of the scanner driver 21 is supplied to the image processing apparatus 1.

The printer driver 27 is a program that controls the printer 19 in response to instructions given by a user through operation or in response to a request issued by other program and thereby causes the printer 19 to print out image data that is designated as data that is to be outputted. To print out the designated image data, the printer driver 27 performs various processing such as rasterizing, color conversion (i.e., CMYK separation), binarization, interlacing, and the like on the designated image data to generate print control data. The print control data is outputted to the printer 19. In this way, the printer driver 27 causes the printer 19 to print out the designated image data.

The image processing program 20 is made up of a plurality of program modules, which include a rectangular area setting unit (i.e., a rectangular area setting module) 22, a background setting unit 23, a black edge statistics unit 24, a judgment unit 25, a correction unit 26, and the like. A more detailed explanation of these program modules is given below.

The rectangular area setting unit 22 is a program module that causes the PC to function as a quadrangular or polygonal area setting section according to an aspect of the invention. The rectangular area setting unit 22 implements a function of setting, for image data, a rectangular area(s) that surrounds a group(s) of pixels that is definitely formed on the front of a sheet of original document with certainty. Herein, one side of a sheet of original document that is subjected to scanning by the scanner 17 for image data acquisition is defined as the front of the sheet. Generally speaking, an edge that corresponds to a character, a photo image, a graphic object, or the like that is printed on the front of a sheet of original document is stronger (i.e., sharper) than an edge that corresponds to a character, a photo image, a graphic object, or the like that is printed on the back of the sheet, which is the other side of the sheet. In addition, generally speaking, the brightness (i.e., luminosity) of a group of pixels that corresponds to characters, a photo image, a graphic object, or the like printed on the front of a sheet of original document is less than (i.e., darker than) that of reverse-side see-through image components of the same characters, photo image, graphic object, or the like printed on the back of the sheet. In other words, the edge strength of a group of pixels that corresponds to a set of characters, a photo image, a graphic object, or the like that is printed on the front of a sheet of original document and the brightness thereof are different from those of reverse-side see-through image components. With attention being focused on such differences in characteristics between a group of pixels corresponding to a set of characters, a photo image, or a graphic object that is printed on the front of a sheet of original document and reverse-side see-through image components, it is possible to set, for image data, a rectangular area(s) that surrounds a group(s) of pixels that is definitely formed on the front of the sheet with certainty. More specifically, a rectangular area can be set as follows: for example, a differential image of image data is derived; the derived differential image is subjected to binarization with the use of a threshold value; an edge image is formed as a result of the binarization; then, contour tracing processing is performed to detect a closed curve; finally, a rectangular area surrounding the closed curve is set. Though the threshold value that is used for the binarization of the differential image may be a fixed value, it is set by measuring the frequency distribution of tone values of the differential image for each image data here. Alternatively, for example, image data may be subjected to binarization with a threshold value being set for a tone value; then, a rectangular area that surrounds a darker-side group of pixels may be set. Though the threshold value used for the binarization may be a fixed value, it is preferable to set it by measuring the frequency distribution of tone values for each image data or set it depending on the type of an original document.

The background setting unit 23 is a program module that causes the PC to function as a background setting section according to an aspect of the invention. The background setting unit 23 implements a function of measuring the frequency distribution of tone values outside a rectangular area that is set by the rectangular area setting unit 22, measuring a brightest tone value B in a margin range (i.e., blank range), which is a range of tone values in which image data is distributed significantly, measuring a most frequent value M in the margin range, and setting a background range, which is a range that includes the most frequent value M as a median point (i.e., midrange or midpoint) and further includes the brightest tone value B as one end of the range. The frequency distribution may be obtained by calculating lightness for each pixel from the tone value of each channel, red (R), green (G), and blue (B), of image data and carrying out measurement on the tone value of lightness. Alternatively, measurement may be carried out for the tone value of the G channel only. Herein, the term "distributed significantly" (significant distribution) means inevitable distribution, which is not accidental distribution caused by electric noise, dust noise, or the like. Specifically, for example, it suffices that a range where frequency is 0.5% or greater in relation to the total number of pixels located outside a rectangular area is regarded as the above range in which image data is distributed significantly. A darkest tone value S in the background range can be calculated using the following formula (1).

$$S = M - |B - M| \tag{1}$$

The black edge statistics unit 24 is a program module that causes the PC to function as a black edge statistics section according to an aspect of the invention. The black edge statistics unit 24 implements a function of measuring the frequency distribution of the tone values of black edge inside a rectangular area that is set by the rectangular area setting unit 22 and measuring a greatest brightness value (i.e., brightest value) "b" in a black edge range. The black edge range is a range of tone values in which black edge is distributed significantly. The term "black edge" means, among all edge pixels, some edge pixels that are darker than other edge pixels located adjacent thereto with a contour line being interposed therebetween. The black edge range varies when a threshold value that is used for detecting black edge from image data is adjusted. The threshold value that is used for the detection of black edge may be a fixed value that has been set in advance. Alternatively, the threshold value may be set by measuring the frequency distribution of tone values of a differential image; a fixed value may be set for each type of an original document.

The judgment unit 25 is a program module that causes the PC to function as a judging section according to an aspect of the invention. The judgment unit 25 implements a function of selectively judging, among all groups of pixels included in image data, some group(s) of pixels that have tone values that fall within a target range as target components. The target range is a range that is included in the margin range (i.e., a part of the margin range), is darker than the background range that is set by the background setting unit 23, and is brighter than the greatest brightness value "b" that is measured by the black edge statistics unit 24. The target range is a range of tone values that satisfies the following formula (2) or (3). In the formulae below, the lowercase letter "s" denotes the darkest tone value in the margin range.

[In a case where b is smaller than s (b<s)]

$$s < \text{Target Range} < S \quad (2)$$

[In a case where b is not smaller than s (s≦b)]

$$b < \text{Target Range} < S \quad (3)$$

The judgment unit 25 judges whether the background range overlaps with the black edge range or not. In a case where the background range overlaps with the black edge range, it may be judged that there is no target component. Alternatively, a predetermined margin "d" may have been set in advance. The target range may be narrowed by the preset margin as shown in the following formulae (4) and (5).

[In a case where b is smaller than s (b<s)]

$$s + d < \text{Target Range} < S \quad (4)$$

[In a case where b is not smaller than s (s≦b)]

$$b + d < \text{Target Range} < S \quad (5)$$

The correction unit 26 is a program module that causes the PC to function as a correcting section according to an aspect of the invention. The correction unit 26 implements a function of correcting the target components judged by the judgment unit 25. Specifically, the correction unit 26 implements a function of substituting the most frequent value M that is measured by the background setting unit 23 for the tone values of the target components (i.e., replacing the tone values of the target components with the most frequent value M), thereby correcting the target components in such a way as to make it practically impossible or difficult to distinguish the target components from background components. As an example of modified replacement, the correction unit 26 may implement a function of substituting the average value of tone values of a group of pixels that have the tone values falling within the background range that is set by the background setting unit 23 for the tone values of the target components, thereby correcting the target components in such a way as to make it practically impossible or difficult to distinguish the target components from the background components.

3. Operation of Image Processing Apparatus

Figure 3:
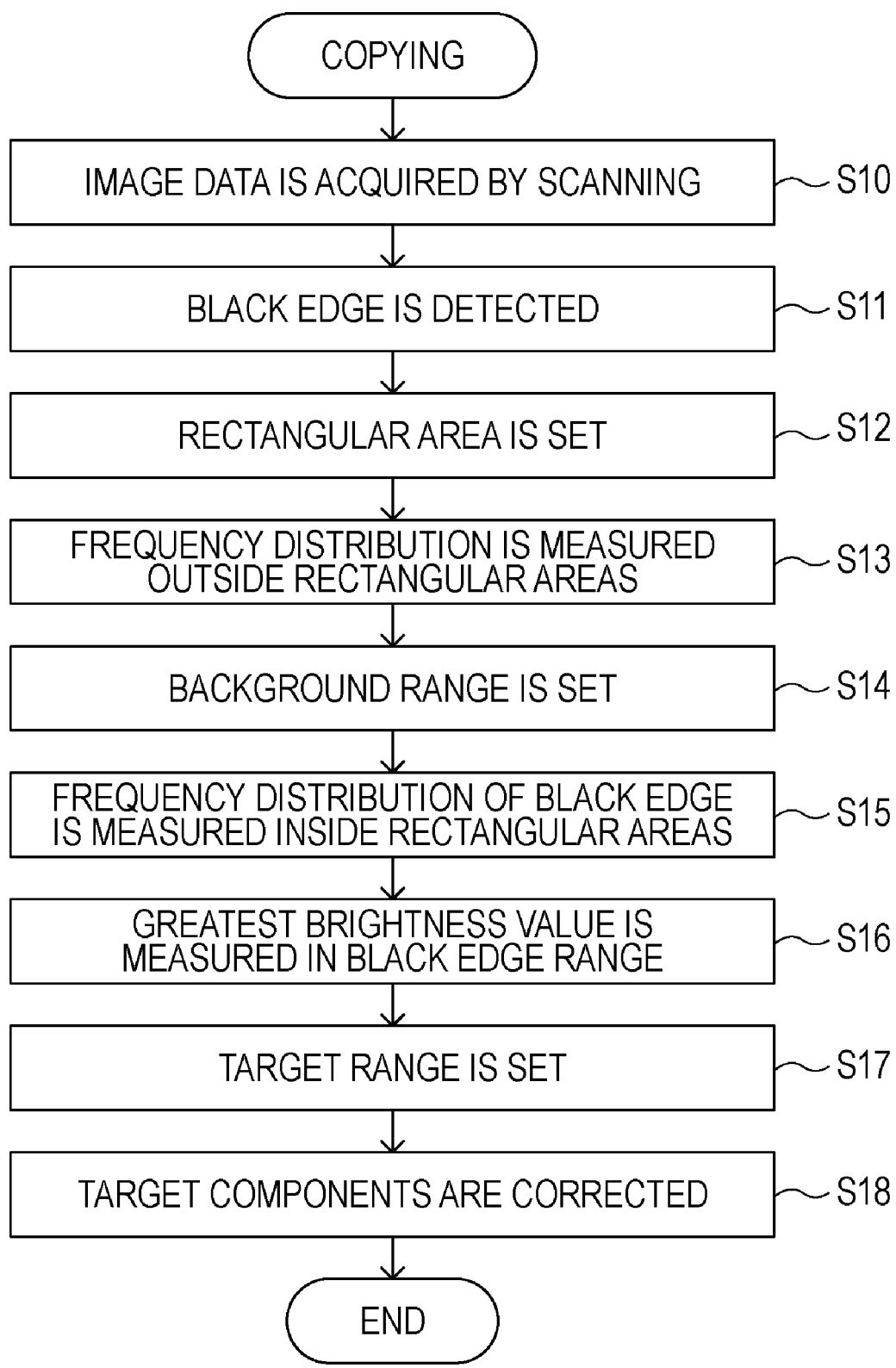
FIG. 3 is a flowchart according to an exemplary embodiment of the invention.

Next, with reference to the flowchart of FIG. 3, a method for suppressing see-through photo-optical appearance of any reverse-side image on the front of a reproduced copy, which is implemented by means of the image processing apparatus 1 having the above configuration, is explained in detail.

As a first step, the scanner 17 acquires image data by scanning an original document. The image data read by the scanner 17 is supplied to the image processing apparatus 1 (S10).

Next, the image processing apparatus 1 detects black edge of the image data supplied from the scanner 17 and forms an edge image (S11). A threshold value is set for a differential image of the image data, where the threshold value is such a value that ensures that, when an edge that is darker than neighboring pixels and has a relatively large tone difference between the tone of the edge and the tone of the neighboring pixels is detected as a black edge, it is limited to a group(s) of pixels corresponding to a set of characters, a photo image, or a graphic object that is printed on the front of a sheet of original document that is detected as the black edge.

Figure 4:
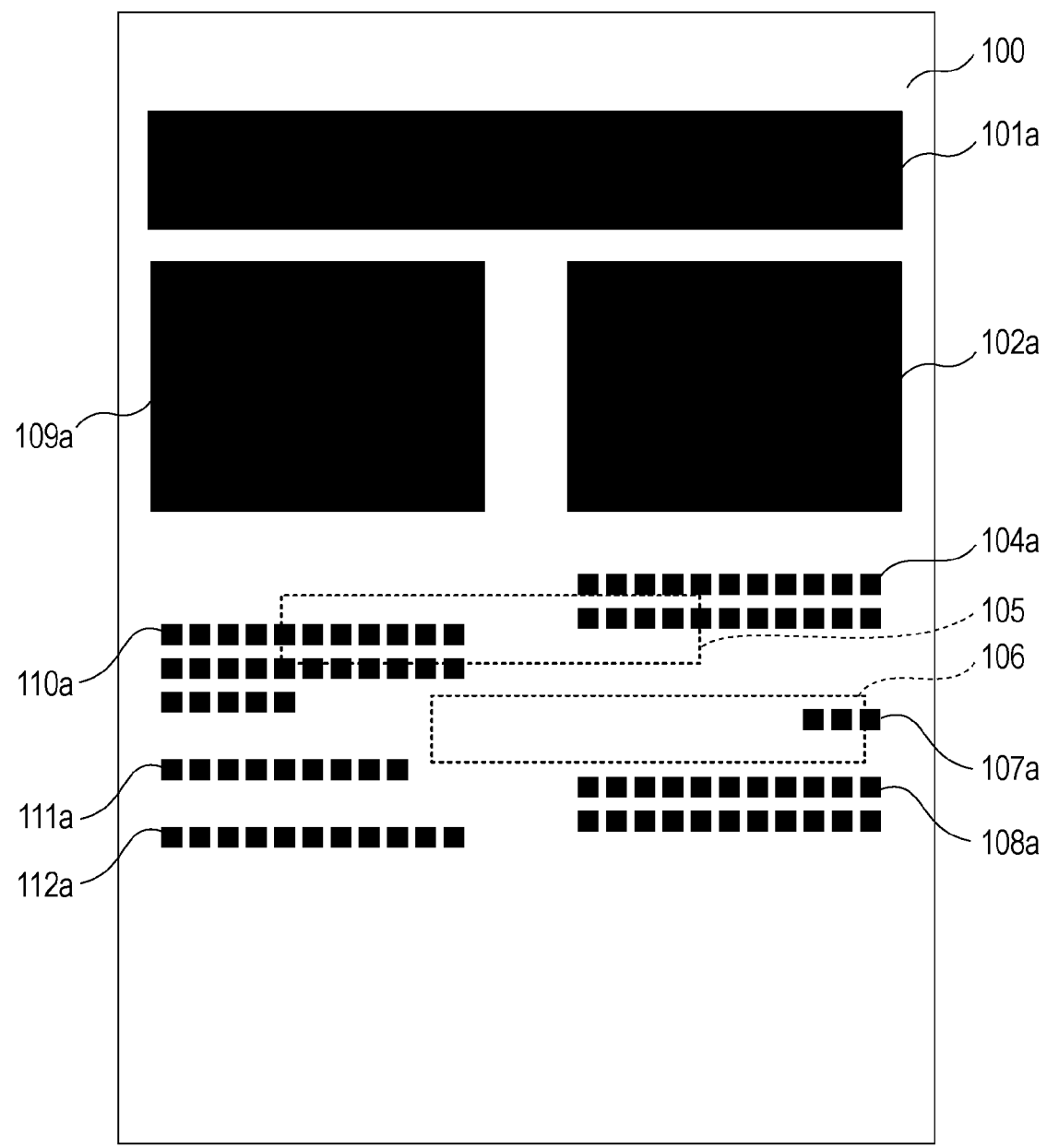
FIG. 4 is a schematic diagram according to an exemplary embodiment of the invention.

Next, the image processing apparatus 1 sets a rectangular area(s) surrounding a closed curve that is contoured by the black edge (S12). FIG. 4 is a diagram that schematically illustrates an example of a state in which a plurality of rectangular areas is set for the image data that is illustrated in FIG. 1. Each of the set rectangular areas is shown as a black area. To indicate correspondences between rectangular areas and pixel groups making up image data, the same reference numerals (i.e., the numerical part of each reference symbol as in "101" of "101*a*") are used in these corresponding drawings. A rectangular area(s) is set for each of the group of pixels 101, 102, 104, 107, 108, 109, 110, 111, and 112 corresponding to a set of characters, a photo image, or a graphic object that is printed on the front of a sheet of original document. On the other hand, no rectangular area is set for the groups of pixels 105 and 106 each of which corresponds to reverse-side see-through image components of a graphic object or the like that is printed on the back of the sheet. In addition, no rectangular area is set for the group of pixels 100 that corresponds to the ground color of the sheet. The reason why no rectangular area is set for these groups of pixels 100, 105, and 106 is that their edges are relatively weak in comparison with those of the other pixel groups. In other words, since a difference between the tone thereof and the tone of neighboring pixels is comparatively small, there is not any rectangular area that is set for these groups of pixels 100, 105, and 106. Therefore, it follows that the groups of pixels located outside the rectangular areas include the group of pixels 100, which corresponds to the ground color of the sheet of original document, and the groups of pixels 105 and 106, each of which corresponds to reverse-side see-through image components of a graphic object or the like that is printed on the back of the sheet, only.

Next, the image processing apparatus 1 measures the frequency distribution of tone values outside the rectangular areas (S13). In this example of the image data illustrated in FIG. 1, the image processing apparatus 1 measures the frequency distribution of tone values for the group of pixels 100 corresponding to the ground color of the sheet of original document and the groups of pixels 105 and 106 corresponding to reverse-side see-through image components.

Next, the image processing apparatus 1 measures the brightest tone value B in the margin range, which is a range of tone values in which the groups of pixels located outside the rectangular areas are distributed significantly, measures the most frequent value M in the margin range, sets the background range, which is a range that includes the most frequent value M as a median point and further includes the brightest tone value B as one end of the range, and sets the darkest tone value S in the background range (as the other end of the range) (S14).

Next, the image processing apparatus 1 measures the frequency distribution of black edge inside the rectangular areas (S15).

Next, the image processing apparatus 1 measures the greatest brightness value "b" in the black edge range, which is a range of tone values in which black edge is distributed significantly (S16).

Figure 5:
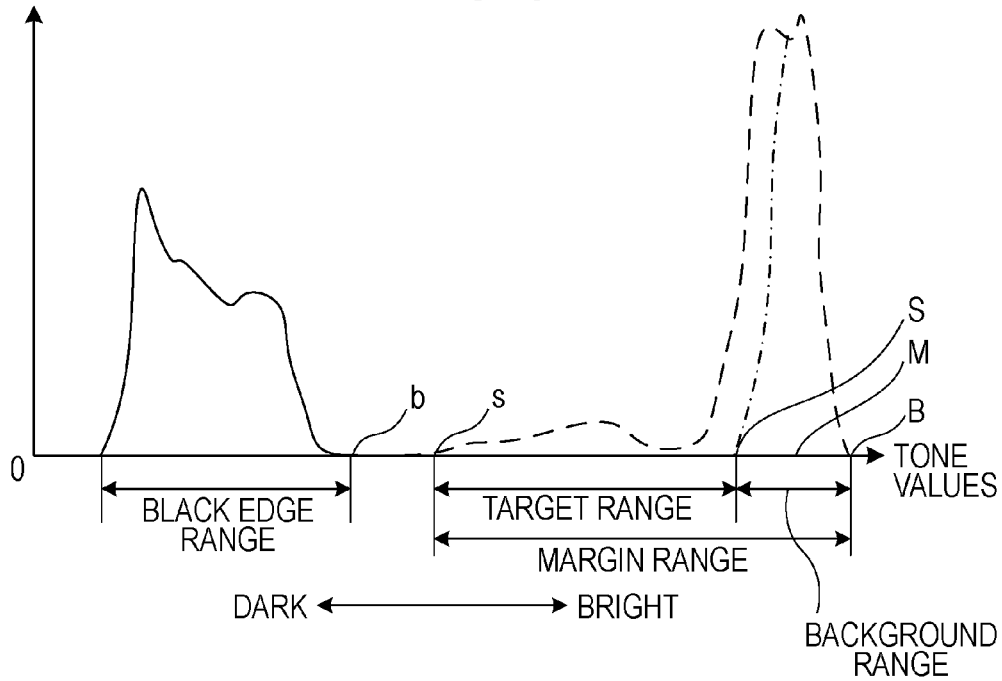
FIG. 5 is a diagram of a histogram according to an exemplary embodiment of the invention.
Figure 6:
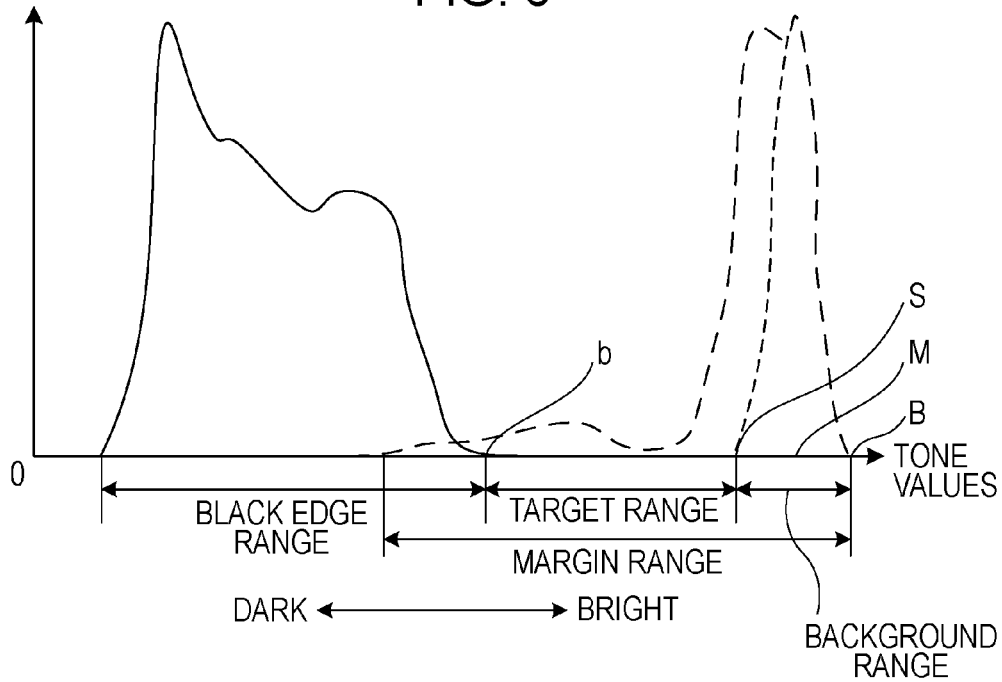
FIG. 6 is a diagram of a histogram according to an exemplary embodiment of the invention.
Figure 7:
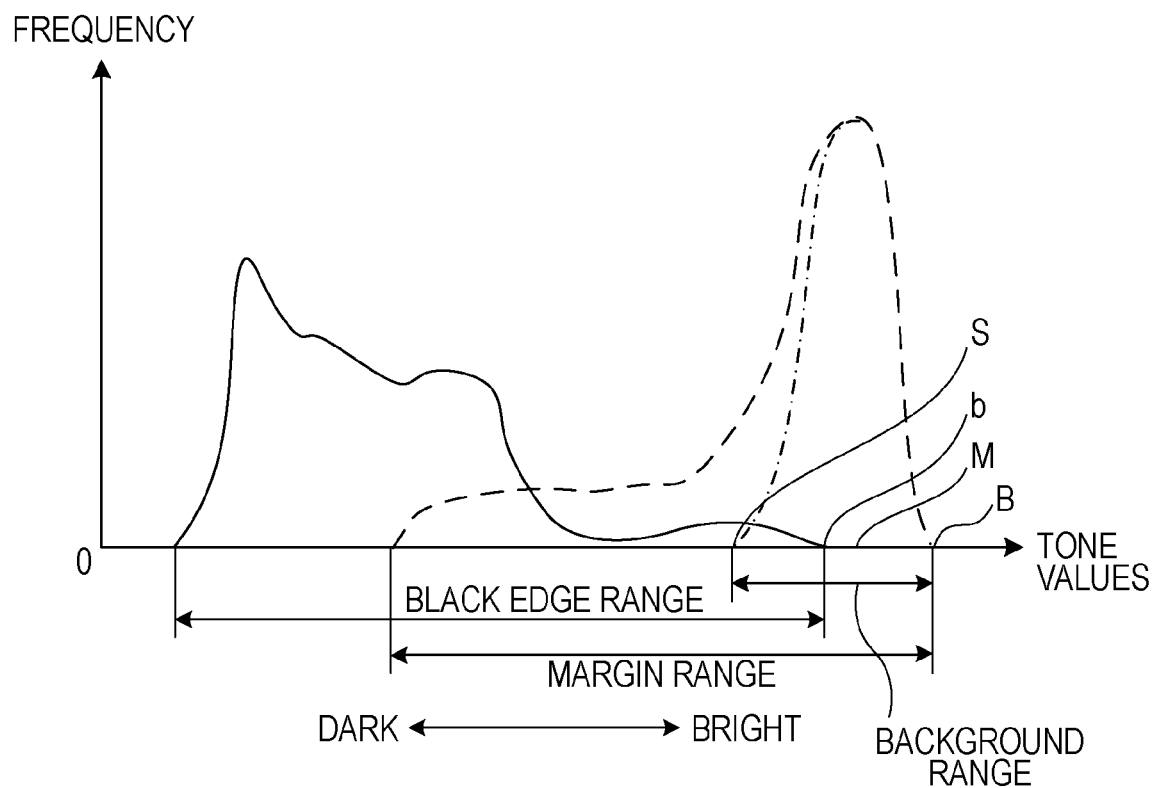
FIG. 7 is a diagram of a histogram according to an exemplary embodiment of the invention.

Next, the image processing apparatus 1 sets the following range as the target range: the range is included in the margin range, is darker than the darkest tone value S of the background range, and is brighter than the greatest brightness value "b" of the black edge range (S17). Each of FIGS. 5, 6, and 7 is a diagram that schematically illustrates an example of a histogram pattern of tone values of image data according to an exemplary embodiment of the invention. As illustrated in FIGS. 5, 6, and 7, there are three patterns in relationships between the margin range, the background range, and the black edge range. Specifically, FIG. 5 shows a case where (i.e., a pattern in which) the black edge range does not overlap with the margin range at all. FIG. 6 shows a case where the black edge range overlaps with the margin range whereas the black edge range does not overlap with the background range at all. FIG. 7 shows a case where the black edge range overlaps with both the margin range and the background range. In a case where the black edge range does not overlap with the margin range at all, a target range R can be mathematically expressed as follows: s<R<S. In a case where the black edge range overlaps with the margin range whereas the black edge range does not overlap with the background range at all, the target range R can be mathematically expressed as follows: b<R<S. In a case where the black edge range overlaps with both the margin range and the background range, the target range R will not be set. No target range will be set in a case where characters or the like are printed with a color(s) that is brighter than a background color(s). For example, when outline characters (i.e., voided characters) are printed on black background that occupies a large proportion of the entire area of an original document, no target range will be set. Even though no target range will be set in such a case, and thus even though reverse-side see-through image components will remain without being removed, the effects of the reverse-side see-through image components on the quality of an image as a whole are minor or insignificant. Since the dispersion of the tone values of background components shows approximately a normal distribution, when tone values that fall within the background range are regarded as the background components, it follows that components that are not true background components (i.e., components between an alternate long and short dash line and a dotted line in each of FIGS. 5, 6, and 7) are also regarded as the background components. However, as long as the tone values are the same as the true background components, it is impossible for human to visually recognize whether a region that corresponds to pixels that have tone values falling within the background range is a true background or not. For this reason, there is not any problem in regarding the tone values falling within the background range as the background components.

Next, the image processing apparatus 1 selectively judges, among all groups of pixels included in image data, some group(s) of pixels that have tone values falling within the target range as target components and then corrects the target components (S18). Specifically, the image processing apparatus 1 judges whether its tone values falls within the target range or not for each of all pixels of the image data. Then, the image processing apparatus 1 replaces the tone values of the selectively judged group(s) of pixels, that is, a pixel group(s) whose tone values fall within the target range, with the most frequent value M of the background range. As a result, reverse-side see-through image components are suppressed. After the suppression of reverse-side see-through image components as a result of the correction processing explained above, the image data is subjected to printing by means of the printer 19. Since the printer 19 prints out the image data with the suppressed reverse-side see-through image components as designated print data, it is possible to obtain a reproduced copy of an original document that is substantially free from the problem of see-through photo-optical appearance of any reverse-side image on the front of the reproduced copy.

4. Other Embodiments

The technical scope of the invention is not limited to the foregoing exemplary embodiment. Needless to say, the invention can be modified in various ways within a range not departing from the gist of the invention. For example, the sequential order of processing steps explained in the foregoing embodiment of the invention is a mere example. The processing steps may be executed in any modified order as long as functions and/or features that are recited in appended claims are embodied therein. In the foregoing embodiment of the invention, it is explained that reverse-side see-through image components are suppressed without correcting background components. However, the scope of the invention is not limited to such an example. For example, the image processing apparatus 1 may set a range that is included in a margin range and is brighter than the greatest brightness value "b" of a black edge range as a target range. The image processing apparatus 1 may replace the tone values of selectively judged groups of pixels, that is, pixel groups whose tone values fall within the target range, with a brightest tone value (white) or the like. It is advantageous in terms of the speed of processing to shape a rectangular area as an area of a rectangle that has two sides that are parallel to the horizontal direction of image data and two sides that are parallel to the vertical direction of the image data. However, if the processing speed may be sacrificed, it is possible to shape a rectangular area as an area of a rectangle that has two sides that are not parallel to the horizontal direction of image data. Alternatively, if the processing speed may be sacrificed, the area may be shaped as an area of a parallelogram or an area of a polygon other than a quadrangle.

What is claimed is:

1. An image processing apparatus comprising: a quadrangular or polygonal area setting section that sets a quadrangular or polygonal area that surrounds a group of pixels that has predetermined characteristics for image data; a background setting section that measures frequency distribution of tone values outside the quadrangular or polygonal area, measures a brightest tone value B in a margin range, which is a range of tone values in which the image data is distributed significantly, measures a most frequent value M in the margin range, and sets a background range, which is a range that includes the most frequent value M as a median point and further includes the brightest tone value B as one end of the range; a black edge statistics section that measures frequency distribution of tone values of black edge inside the quadrangular or polygonal area and measures a greatest brightness value b in a black edge range, which is a range of tone values in which the black edge is distributed significantly; a judging section that judges, among all groups of pixels included in the image data, some groups of pixels that have tone values that fall within a target range as target components, the target range being a range that is included in the margin range and is brighter than the greatest brightness value b; and one or more processors configured with a correcting section that corrects the target components.

2. The image processing apparatus according to claim 1, wherein the target range is darker than the background range.

3. The image processing apparatus according to claim 1, wherein the judging section judges whether the background range overlaps with the black edge range or not; and in a case where the background range overlaps with the black edge range, it is judged that there is no target component.

4. The image processing apparatus according to claim 1, wherein the correcting section substitutes the most frequent value M for tone values of the target components.

5. The image processing apparatus according to claim 1, wherein the correcting section substitutes an average value of tone values of a group of pixels that have the tone values falling within the background range for tone values of the target components.

6. An image processing method comprising: setting a quadrangular or polygonal area that surrounds a group of pixels that has predetermined characteristics for image data; measuring frequency distribution of tone values outside the quadrangular or polygonal area, measuring a brightest tone value B in a margin range, which is a range of tone values in which the image data is distributed significantly, measuring a most frequent value M in the margin range, and setting a background range, which is a range that includes the most frequent value M as a median point and further includes the brightest tone value B as one end of the range; measuring frequency distribution of tone values of black edge inside the quadrangular or polygonal area and measuring a greatest brightness value b in a black edge range, which is a range of tone values in which the black edge is distributed significantly; judging, among all groups of pixels included in the image data, some groups of pixels that have tone values that fall within a target range as target components, the target range being a range that is included in the margin range and is brighter than the greatest brightness value b; and one or more processors configured with correcting the target components.

7. A non-transitory image recording medium, having an image processing program that causes a computer to implement functions comprising: a quadrangular or polygonal area setting function of setting a quadrangular or polygonal area that surrounds a group of pixels that has predetermined characteristics for image data; a background setting function of measuring frequency distribution of tone values outside the quadrangular or polygonal area, measuring a brightest tone value B in a margin range, which is a range of tone values in which the image data is distributed significantly, measuring a most frequent value M in the margin range, and setting a background range, which is a range that includes the most frequent value M as a median point and further includes the brightest tone value B as one end of the range; a black edge statistics function of measuring frequency distribution of tone values of black edge inside the quadrangular or polygonal area and measuring a greatest brightness value b in a black edge range, which is a range of tone values in which the black edge is distributed significantly; a judging function of judging, among all groups of pixels included in the image data, some groups of pixels that have tone values that fall within a target range as target components, the target range being a range that is included in the margin range and is brighter than the greatest brightness value b; and one or more processors configured with a correcting function of correcting the target components.

* * * * *